United States Patent [19]
Hu

[11] Patent Number: 6,059,366
[45] Date of Patent: May 9, 2000

[54] ADJUSTABLE ARMREST FOR CHAIRS

[76] Inventor: Jung-Hua Hu, No. 55-3, Sha-luen Rd, Jung-sha Tsung, An-ding Shiang, Tai-nan Shian, Taiwan

[21] Appl. No.: 09/312,817

[22] Filed: May 17, 1999

[51] Int. Cl.[7] ............................... A47C 7/54; B60N 2/46
[52] U.S. Cl. ............................... 297/411.35; 297/411.31; 297/411.32
[58] Field of Search .................. 297/411.35, 411.31, 297/411.32, 411.33

[56] References Cited

U.S. PATENT DOCUMENTS

| | | | |
|---|---|---|---|
| 5,407,249 | 4/1995 | Bonutti | 297/411.35 |
| 5,484,187 | 1/1996 | Doerner et al. | 297/411.35 X |
| 5,590,934 | 1/1997 | Gibbs | 297/411.35 X |
| 5,655,814 | 8/1997 | Gibbs | 297/411.35 X |
| 5,749,628 | 5/1998 | Synder et al. | 297/411.31 X |
| 5,876,097 | 3/1999 | Cao | 297/411.35 X |
| 5,927,811 | 7/1999 | Tseng | 297/411.35 X |

Primary Examiner—Milton Nelson, Jr.
Assistant Examiner—Rodney B. White
Attorney, Agent, or Firm—Dougherty & Troxell

[57] ABSTRACT

An adjustable armrest comprising mainly a fixing seat, an adjustable seat, a connecting member, and a rest cushion. The fixing seat having a polygon protrusion, two locking holes for locking a chair stump, two lower recesses each having a holder for holding a spring and two screw holes, and two covering pads each having one central opening and two screw holes for covering the lower recesses wherein a steel-ball 11 with a diameter bigger than that of the central opening positioned thereon. The adjustable seat has a long opening with a width equal to or slightly bigger than the length of two opposite sides of the polygon protrusion, two sets adjusting orifices arranged besides the long opening, and two fixing holes for fixing a rest cushion. The connecting member containing a cap, a washer and a shield for connecting the fixing seat and adjustable seat by clipping a bolt upward passing from the bottom of the fixing seat.

3 Claims, 4 Drawing Sheets

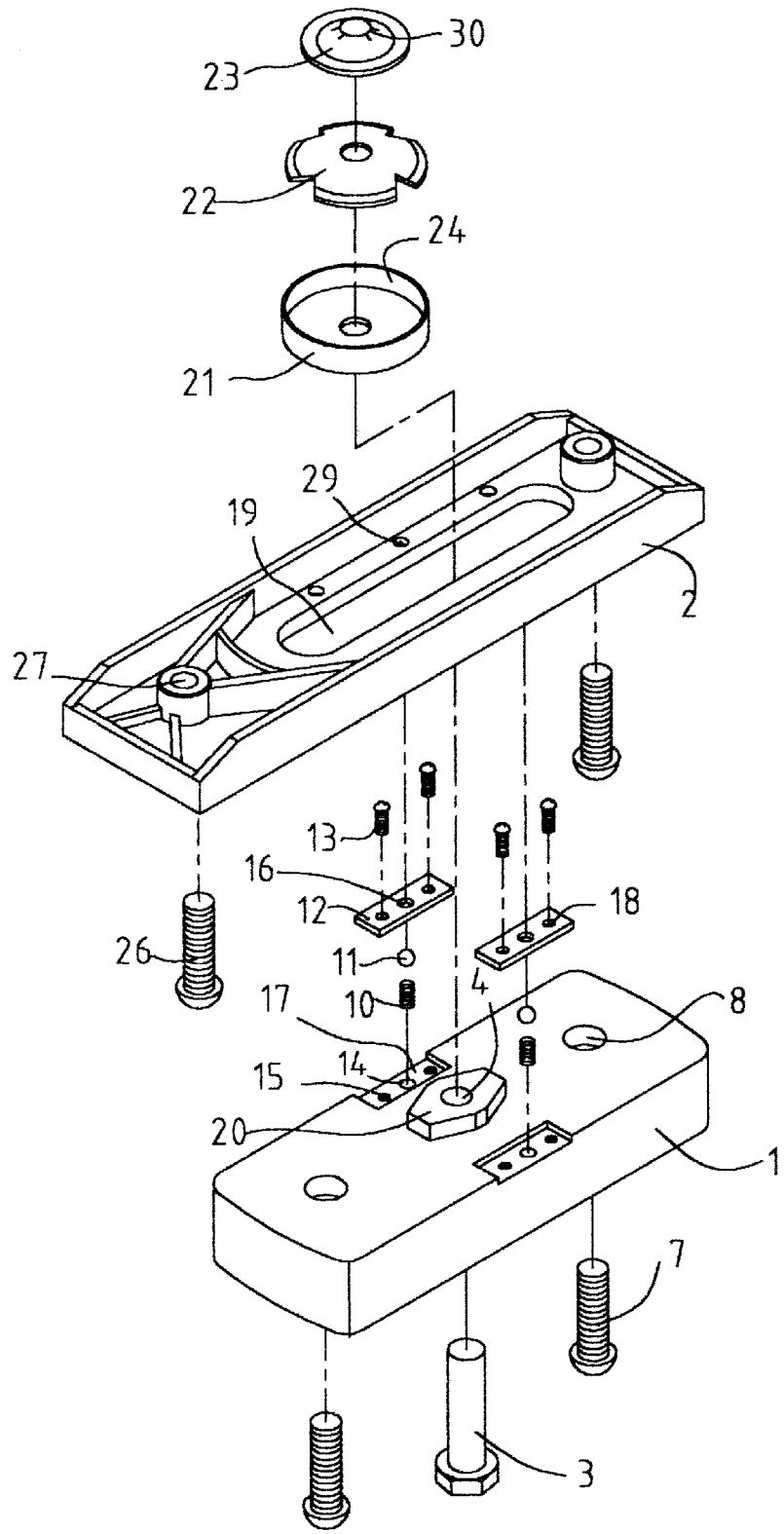
FIG:1

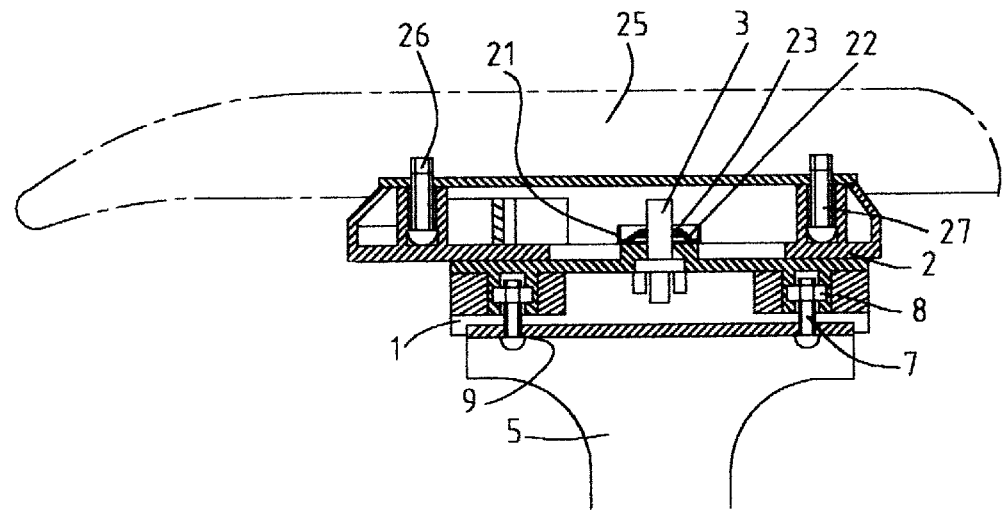
FIG:2
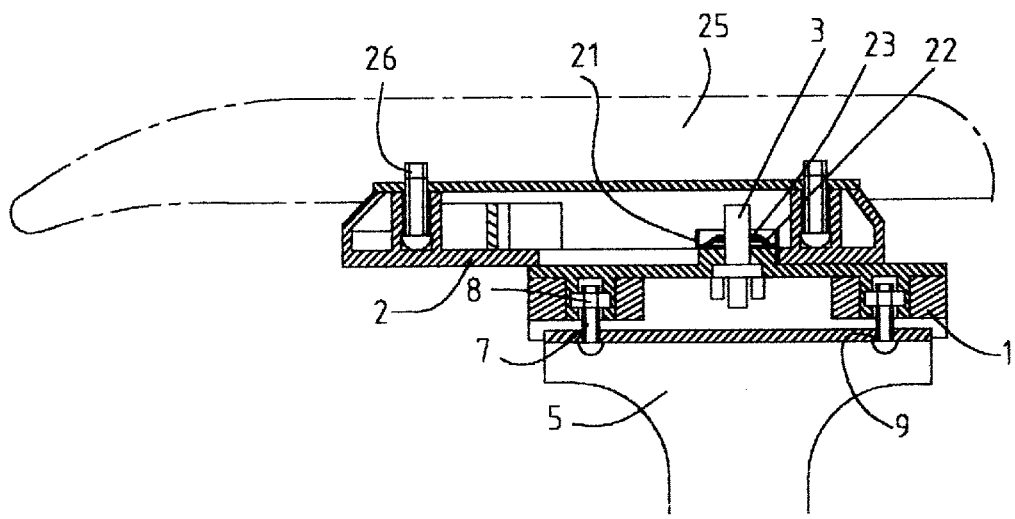
FIG:3

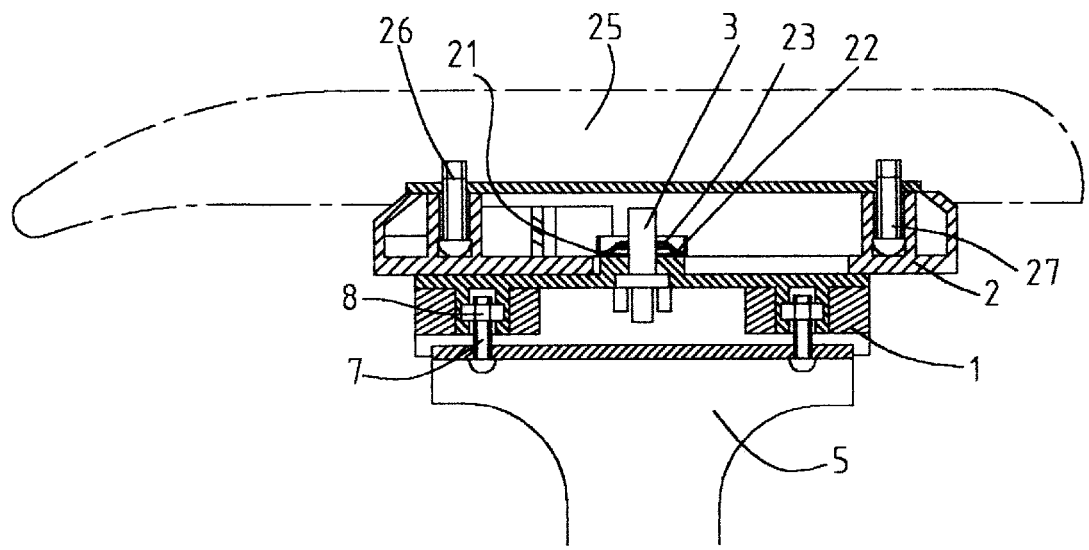
FIG:4
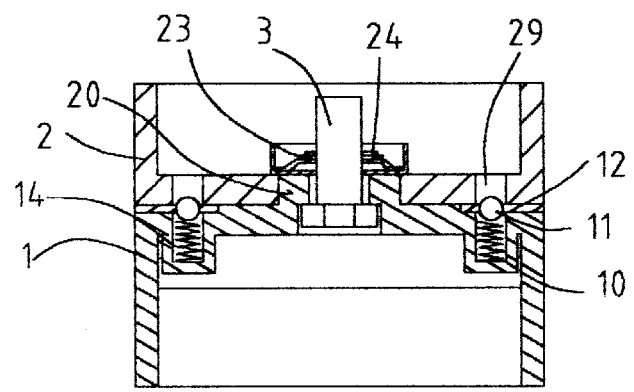
FIG:5

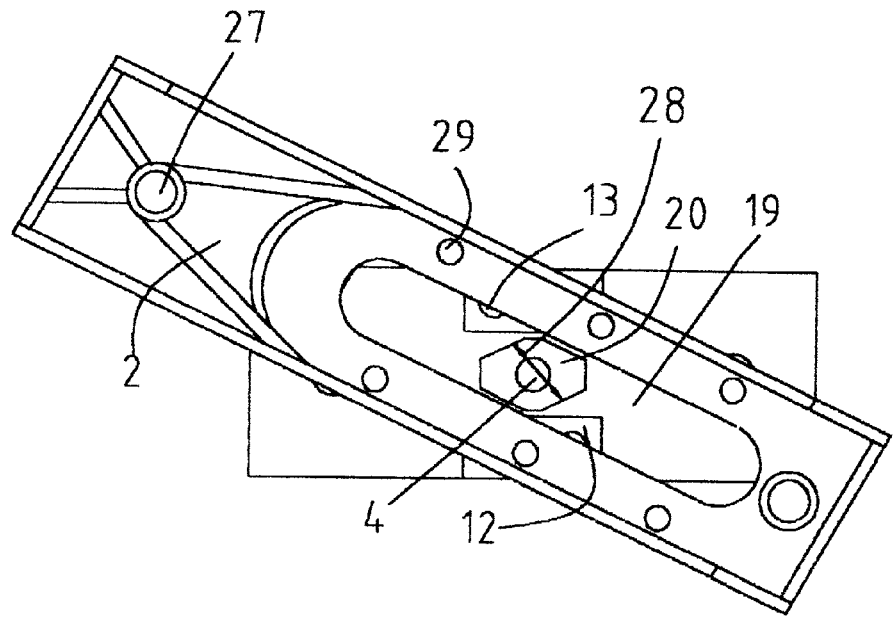
FIG:6
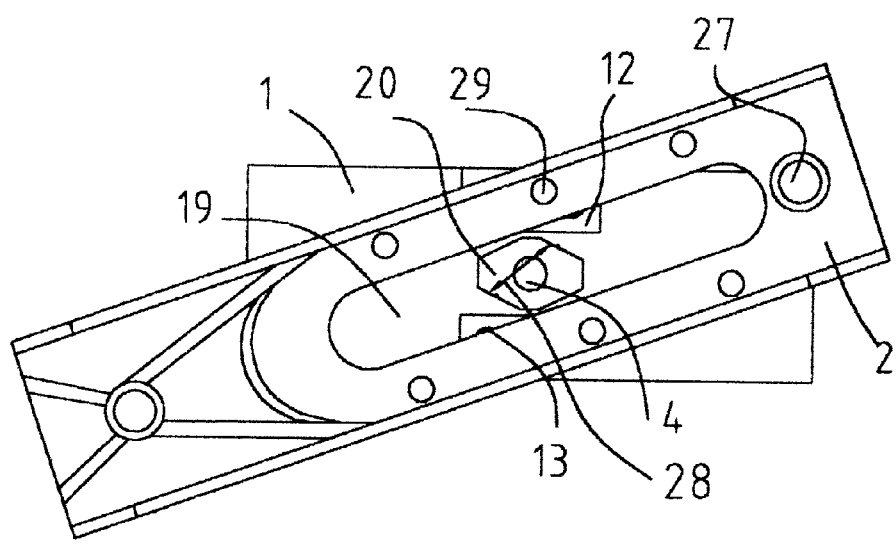
FIG:7

ADJUSTABLE ARMREST FOR CHAIRS

FIELD OF THE INVENTION

This invention relates to an armrest for chairs, more particular to an adjustable armrest for chairs which is movable back and forth as well as right and left.

BACKGROUND OF THE ART

The conventional chair arms are a fixed structure, which can not be moved according to the physical need of different persons to a necessary position. Therefore, an adjustable armrest is highly need for the peoples who spent a long period of time in front of the computer terminals to properly support forearms or wrists to avoid the risk of injury.

SUMMARY OF THE INVENTION

According to the invention, it is to provide an adjustable armrest for chairs comprising a fixing seat having a polygon protrusion, two locking holes for locking a chair stump, two lower recesses each having a holder for holding a spring and two screw holes, and two covering pads each having one central opening and two screw holes for covering said lower recesses wherein a steel-ball with a diameter bigger than that of said central opening positioned thereon;

an adjustable seat having a long opening with a width equal to or slightly bigger than the length of two opposite sides of the polygon protrusion, two sets adjusting orifices arranged besides the long opening, and two fixing holes for fixing a rest cushion;

a connecting member containing a cap, a washer and a shield for connecting said fixing seat and adjustable seat by clipping a bolt upward passed from the bottom of said fixing seat; and a rest cushion.

There is another embodiment of the present invention, wherein the polygon protrusion is a hexagon protrusion.

There is still another embodiment of the present invention, wherein the two sets adjusting orifices arranged besides the long opening each have at least three orifices.

BRIEF DESCRIPTION OF THE DRAWINGS

FIG. 1 is a perspective view of a preferred embodiment in accordance with the present invention, in which each part is separated;

FIG. 2 is a perspective side view of a preferred embodiment in accordance with the present invention;

FIG.3 is a perspective side view of a preferred embodiment in accordance with the present invention;

FIG. 4 is a perspective side view of a preferred embodiment in accordance with the present invention;

FIG. 5 is a perspective front view of a preferred embodiment in accordance with the present invention;

FIG. 6 is a perspective top view of a preferred embodiment in accordance with the present invention in which the rest cushion is removed; and FIG. 7 is a perspective top view of a preferred embodiment in accordance with the present invention in which the rest cushion is removed.

DESCRIPTION OF THE PREFERRED EMBODIMENT

Referring to FIG. 1, the armrest of the present embodiment comprises mainly a fixing seat 1, an adjustable seat 2, a connecting member 21, 22 and 23, and a rest cushion 25. The fixing seat 1 having a polygon protrusion 20, two locking holes 8 for locking a chair stump 5, two lower recesses 17 each having a holder 14 for holding a spring 10 and two screw holes 15, and two covering pads 12 each having one central opening 16 and two screw holes 15 for covering said lower recesses 17 wherein a steel-ball 11 with a diameter bigger than that of said central opening 16 positioned thereon. The adjustable seat 2 has a long opening 19 with a width equal to or slightly bigger than the length of two opposite sides of the polygon protrusion 20, two sets adjusting orifices 29 arranged besides the long opening 19, and two fixing holes 27 for fixing a rest cushion 25. The connecting member containing a cap 21, a washer 22 and a shield 23 for connecting said fixing seat 1 and adjustable seat 2 by clipping a bolt 3 upward passing from the bottom of said fixing seat 1.

FIG. 2 illustrates the armrest of the present embodiment positioned on a chair stump 5. Firstly, the fixing seat 1 and adjustable seat 2 are connected by a bolt 3 and are fastened by the connecting member. Secondly, the combined structure is then firmly attached to a rest cushion 25 by inserting two bolts 26 through fixing holes 27. Finally, the armrest of the present invention is mounted to the chair stump 5 by passing bolts 7 through screw holes 8 and 9 on the fixing seat 1 and chair stump 5 respectively.

Referring to FIGS. 3 to 5, the armrest may shaft back and forth by sliding the two steel-balls 11 between two sets adjusting orifices 29 of the adjustable seat 2. One set adjusting orifices 29 may have at least three or more orifices.

FIGS. 6 and 7 illustrate the swiveling function of the present invention. Because the width of the long opening 19 is equal to or slightly bigger than the length of two opposite sides of the polygon protrusion 20, the adjustable seat 2 may move right or left along its fixed angle. Accordingly, another embodiment of the invention is that the protrusion 20 is a hexagon.

It is noted that the embodiment of the improved adjustable armrest for chairs described herein in detail for exemplary purposes is of course subject to many different variations in structure, design, application and methodology. Being many varying and different embodiments may be made within the scope of the inventive concept(s) herein taught, and many modifications may be made in the embodiment herein detailed in accordance with the descriptive requirements of the law.

It is to be understood that the details herein are to be interpreted as illustrative and not in a limiting sense.

I claim:

1. An adjustable armrest for chairs comprising a fixing seat having a polygon protrusion, two locking holes for locking a chair stump, two lower recesses each having a holder for holding a spring and two screw holes, and two covering pads each having one central opening and two screw holes for covering said lower recesses wherein a steel-ball with a diameter bigger than that of said central opening positioned thereon;

an adjustable seat having a long opening with a width at least equal to the length of two opposite sides of the polygon protrusion, two sets of adjusting orifices arranged beside the long opening, and two fixing holes for attaching a rest cushion;

a connecting member containing a cap, a washer and a shield for connecting said fixing seat and adjustable seat together by attaching the shield to a bolt extending upwardly from a bottom of said fixing seat; and a rest cushion attached to said adjustable seat.

2. An adjustable armrest of claim 1, wherein the polygon protrusion is a hexagon protrusion.

3. An adjustable armrest of claim 1, wherein the two sets adjusting orifices arranged beside the long opening each have at least three orifices.

* * * * *